Dec. 14, 1971          D. L. JACKSON          3,626,528
ANCHORED MARKER FLOAT FOR DIVERS
Filed May 11, 1970

INVENTOR.
DAVID L. JACKSON
BY
ATTORNEYS

United States Patent Office 3,626,528
Patented Dec. 14, 1971

3,626,528
ANCHORED MARKER FLOAT FOR DIVERS
David L. Jackson, 4504 Cape May Ave.,
San Diego, Calif. 92107
Filed May 11, 1970, Ser. No. 36,016
Int. Cl. B63b *21/52*
U.S. Cl. 9—9                                    3 Claims

ABSTRACT OF THE DISCLOSURE

A plastic float carries a spinning reel and is detachably connected to a leaded weight. When a diver wishes to mark a spot he loosens and drops a weight and lets the float rise. Line on a reel in the float plays out permitting the float to rise to the surface.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The relatively unencumbered scuba and skin diver is fast and mobile and is particularly effective in underwater work to moderate depths. In the course of underwater exploration it is frequently desirable that the diver mark selected areas or spots with anchored floats which can be seen from the surface. Such float mechanisms have heretofore been quite complex, heavy, difficult to carry and awkward to launch and too costly to be considered disposable.

The object of this invention is to provide an anchored float which is inexpensive to manufacture, simple to launch, is small in size and light in weight so that a considerable number of float assemblies can be carried bandoleer fashion.

SUMMARY OF THE INVENTION

The anchored float assemblies of this invention comprises two parts which until launched are detachably connected. One part is a leaded weight and the other is a buoy. In the buoy or float is a stationary bobbin with a guide for axial delivery of line after the fashion of the conventional spinning reel in the fisherman's art.

A measured amount of line plays out as the float rises to the surface. The float, uniquely, comprises a sleeve into which is press fitted three spaced cups. The inside diameter of the sleeve and the outside diameter of the cups are so chosen that a generally watertight junction is made so that air spaces between the cup provide the necessary flotation as well as a chamber for the bobbin.

Figure 1:
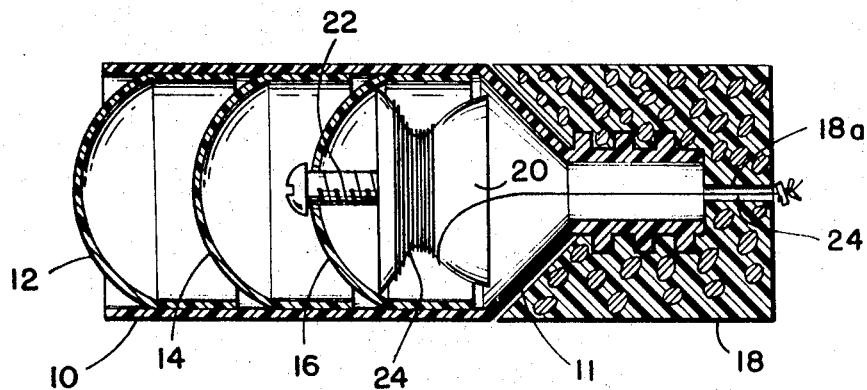
Figure 2:
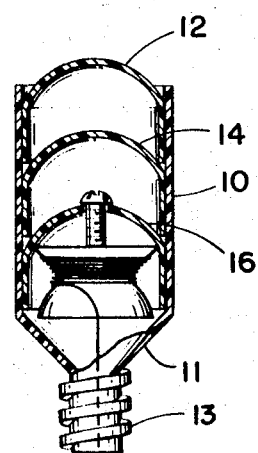
Figure 2:
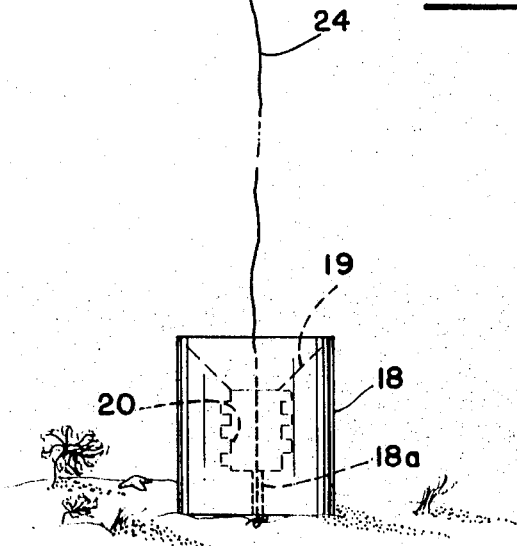

Other features and objects of this invention will become apparent to those skilled in the art by referring to the preferred embodiments described in the following specification and shown in the accompanying drawing in which:

FIG. 1 is a half-section of one specific embodiment of the anchored float of this invention; and FIG. 2 shows the same anchored float deployed in the ocean.

The float member of the assembly of this invention comprises the sleeve 10 containing the three aligned cups 12, 14, and 16. Uniquely, the sleeve and cups are of polyethylene type plastic or semisoft rubber which is quite inexpensive and can be molded or extruded at low cost into the shapes shown. The outside diameters of the cups and the inside diameters of the sleeve are so chosen that watertight connections are generally made when the cups are pushed into place. At one end the sleeve is necked down as shown at 11 and is terminated in a threaded collar 13. The relatively coarse threads employed are for readily detaching the float assembly from the weight 18. The weight can easily be separated from the float even by a diver with heavily gloved hands by simply turning the weight one or two turns.

The spool or bobbin 20 is held in an axial position in cup 16 by the bolt 22. The bolt is pulled up to tighten the bobbin firmly against the inside of cup 16. Light weight fishing line 24, such as monofilament nylon, is wound on the bobbin 20 and the loose end is threaded through the opening 18a in the weight 18. Preferably the amount of line wound on the bobbin is slightly more than the expected depths of the water in which the anchored float is to be used. The free end of the line 24 is knotted or otherwise pegged in opening 18a so as to not permit the line to separate from the weight.

The weight 18 is preferably round and of approximately the diameter of the float and is relieved in a conical recess at one end as shown at 19 to receive the necked down portion 11 of the float. The female threads 20 can be cast to match the male threads 13 on the float. In the interest of economy the weight can be cast of hard plastic in which is embedded scrap metal or lead shot.

In practice it is contemplated that a number of the anchor floats of the type illustrated can be carried in the pockets of the diver and in clips on a cartridge belt and released one at a time. If the outside or sleeve portion of the float is of a bright color it can be seen considerable distances from surface craft.

Obviously many modifications and variations of the present invention are possible in the light of the above teachings. It is therefore to be understood that within the scope of the appended claims the invention may be practiced otherwise than as specifically described.

What is claimed is:

1. In combination in an anchored marker float for divers, the combination comprising:
   a tubular sleeve means;
   a plurality of cups telescoped into said sleeve, the outside diameter of said cups and the inside diameter of said sleeve being predetermined to provide a substantially watertight connection between the cups to provide air space and flotation;
   a weight means detachably connected to said sleeve;
   one of said means having a threaded recess portion;
   the other of said means having a threaded male portion to detachably engage said threaded recess portion;
   a bobbin in said sleeve carrying a predetermined length of line, one end of said line being connected to said detachable weight.

2. In the combination defined in claim 1 said sleeve being necked down at one end and threaded to detachably engage coarse threads in said weight.

3. In the combination defined in claim 1 said weight comprising a molded plastic body containing metal particles said molded body having molded threads to match corresponding threads on said sleeve and having an outside diameter approximately the diameter of said sleeve.

References Cited

UNITED STATES PATENTS

| | | | |
|---|---|---|---|
| 637,147 | 11/1949 | Moriarty | 9—9 |
| 3,137,961 | 6/1964 | Bowers | 43—43.1 |
| 2,942,370 | 6/1960 | Zaruba | 43——3 |
| 2,562,922 | 8/1951 | Kist | 9—8 |

MILTON BUCHLER, Primary Examiner
G. W. O'CONNOR, Assistant Examiner